United States Patent [19]

Fontanes et al.

[11] Patent Number: 4,885,756
[45] Date of Patent: Dec. 5, 1989

[54] METHOD OF DEMODULATING DIGITALLY MODULATED SIGNALS, AND APPARATUS IMPLEMENTING SUCH A METHOD

[75] Inventors: Sylvain Fontanes, Chatou; Patrice Birot, Courbevoie; André Marguinaud, Palaiseau; Thierry Quignon, Nanterre; Brigitte Romann, Boulogne Billancourt, all of France

[73] Assignee: Societe Anonyme dite: Alcatel Espace, Courbevoie, France

[21] Appl. No.: 197,196

[22] Filed: May 23, 1988

[30] Foreign Application Priority Data

May 21, 1987 [FR] France ................ 87 07129

[51] Int. Cl.[4] ........................... H03D 3/18
[52] U.S. Cl. ........................ 375/82; 375/83; 329/300; 329/304
[58] Field of Search .............. 375/82, 83, 84, 85; 329/120, 122, 123, 126, 128, 110, 112

[56] References Cited

U.S. PATENT DOCUMENTS

| 4,457,005 | 6/1984 | Burke et al. ............... | 375/83 |
| 4,516,079 | 5/1985 | York ........................... | 329/104 |
| 4,728,957 | 3/1988 | Hethuin ...................... | 329/110 |
| 4,740,997 | 4/1988 | Heatherington ........... | 375/82 |

FOREIGN PATENT DOCUMENTS 2572603 5/1986 France .

OTHER PUBLICATIONS

IEEE Transactions on Communications, vol. COM-28, No. 8, Aug. 1980, pp. 1190-1196, IEEE, New York, US; C. F. Cahn et al.: "Digital Phase Sampling for Microcomputer Implementation of Carrier Acquisition and Coherent Tracking".

Primary Examiner—Robert L. Griffin
Assistant Examiner—Stephen Chin
Attorney, Agent, or Firm—Sughrue, Mion, Zinn, Macpeak & Seas

[57] ABSTRACT

A signal may be demodulated without using any analog components by using a digital processor. A digitizer delivers the amplitude of the signal to be demodulated at a sampling rate. The signal is acquired from the digitizer and stored in a common memory. The amplitude samples are converted to phase samples. Symbol rate phase hypotheses are generated for splitting the time signal into slices. The carrier phase for one symbol is then calculated for each symbol rate phase hypothesis so that the carrier phase can be estimated over a plurality of (S) symbols. The symbol phase is compared to the carrier phase so that the demodulated signal may be extracted and so that the quality of the demodulation may be estimated.

13 Claims, 4 Drawing Sheets

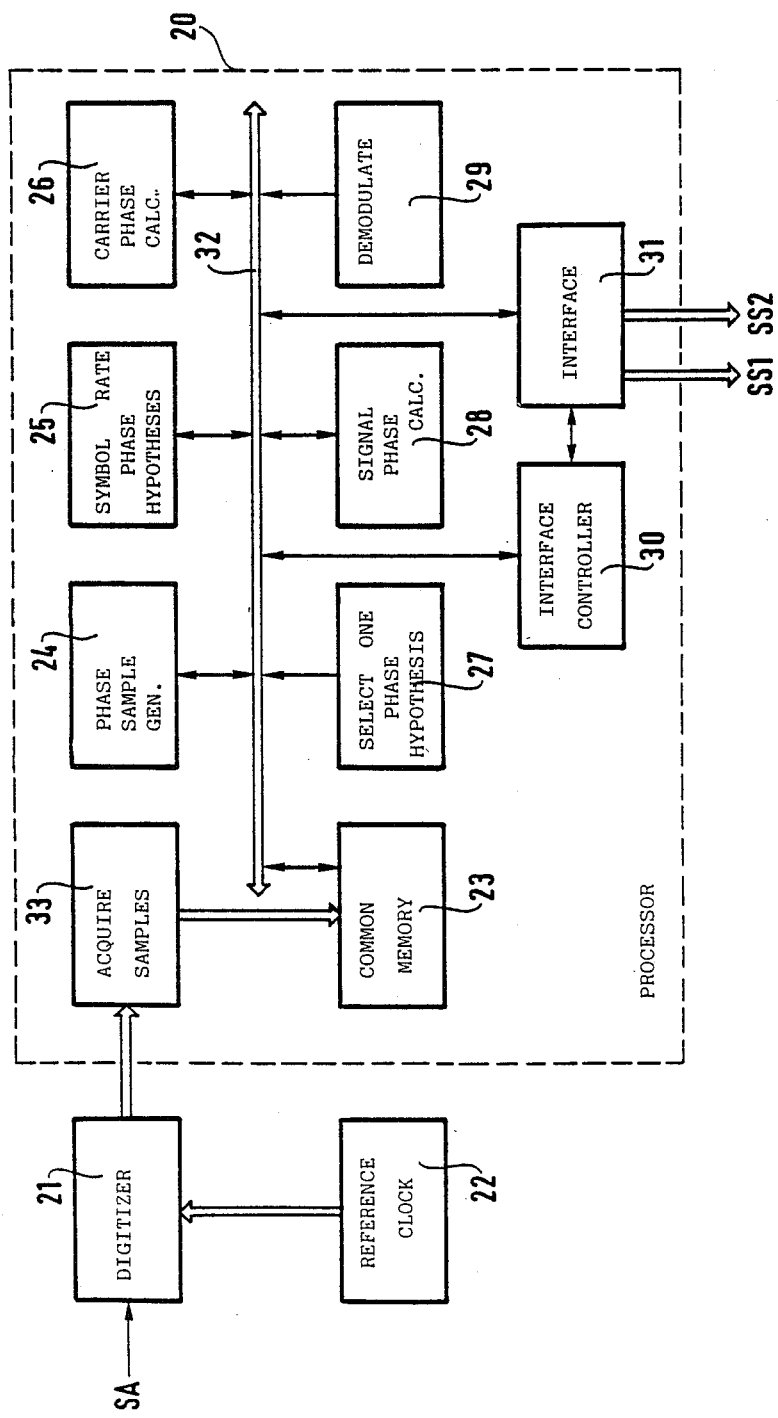

METHOD OF DEMODULATING DIGITALLY MODULATED SIGNALS, AND APPARATUS IMPLEMENTING SUCH A METHOD

The present invention relates to a digital method for demodulating signals which have been digitally modulated by data or digitized speech. It serves, after sampling and digitizing the signals, to reconstitute the modulating signals, the carrier, and the clock rate without making use of any analog components.

BACKGROUND OF THE INVENTION

A considerable amount of literature has been published on the demodulation of signals, and numerous developed and commercialized products exist on the market for data rates running from several tens of bit/s (telegraph signals) to several hundreds of Mbit/s (digital connections over cables carrying digitized telephone channel multiplexes at up to 140 Mbit/s or even 560 Mbit/s, and time division multiple access (TDMA) connections at 120 Mbit/s in the Intelsat and Eutelsat satellite systems).

Prior art products all make use of circuits specifically adapted to the functions to be performed (reconstituting the carrier, reconstituting the clock rate, circuits for taking decisions after post-detection filtering, . . . ). These embodiments in analog form or in the form of a transposition of conventional analog concepts all make use of the principle of real time processing which consists of storing only the results of the processing. Original signal storage occurs only in differential demodulation, and even then the storage is applicable for a fixed delay only.

This processing principle has deleterious consequences on performance and on complexity.

Performance is degraded since, when applying this principle, best adaptation to variability in parameters is not achieved and as a result the system is more sensitive to disturbing signals (noise, interfering spectrum line) superposed on the signals to be measured.

Complexity is increased since, when this principle is used, it is very difficult to provide best adaptation to each of the stages which must be implemented in order to achieve the desired object. In particular, the stages of acquisition and of tracking either require different devices, or else they require analog circuit characteristics which are adapted to each of the stages and it is very difficult to exploit and adapt the devices used to each specific stage as well as possible without excessive complication.

As for demodulation, acquisition of the clock and the phase characteristics of the carrier require a great deal more calculation than do tracking and signal demodulation. A conventional solution cannot optimize the processing member to both of these different situations.

Traditional demodulation methods use various phase lock methods for recovering the carrier and the clock (phase locking after squaring, Costas loop, . . . ) and digitizing occurs only when implementing particular technologies, or during linear approximations that require a great deal of calculation.

The method of the invention makes considerable use of addressable digital memories and of software, thereby eliminating all of the above-mentioned difficulties and making it possible to use an overall algorithm and to approach optimum performance (tuned filter) with a minimum of calculation.

SUMMARY OF THE INVENTION

The invention provides a digital method of demodulating digitally modulated signals, the method comprising the following stages in succession:

a stage for acquiring the sampled and digitized signals;

a stage for calculating and storing phase samples;

a stage for generating clock phase hypotheses;

a stage for calculating the carrier phase and the symbol rate phase over n symbols; and a phase for demodulation per se by comparing the phase of the signal during the symbol under consideration with the phase of the carrier.

The invention also provides a device for implementing this method, said device comprising a digital processor member receiving the signal to be analyzed at its input after it has passed through a digitizer which is connected to a stable reference clock.

More particularly, said processing member comprises:

a common memory circuit;

a circuit for generating phase samples;

a circuit for generating symbol rate phase hypotheses;

a circuit for calculating the carrier phase (e.g. over five symbols);

a circuit for selecting the symbol rate phase hypothesis;

a circuit for calculating the signal phase (e.g. over one symbol);

a demodulator circuit;

a circuit for controlling the interface with the demodulator;

an interface circuit for the demodulated signal;

the above circuits being connected to an interconnection bus by respective two-way links, with the last two circuits being connected to each other by a two-way link; and a circuit for acquiring digitized samples at the input, said circuit being connected to the common memory circuit by a one-way link;

said demoulated signal interface having two outputs;

an output for demodulated signals; and a signal quality output, said outputs constituting the outputs from said processor member.

Advantageously, the various calculation tasks required for demodulation purposes are suitable for being implemented by calculating members controlled by software, with each member being independent of the other members and being capable of addressing memories for reading any of the results of the other members, and for reading the originally recorded signal samples, and for reading the results of its own calculations, and also for writing the results of its own calculations in a zone which is specifically attributed thereto, said memories either being common or else being constituted by a lattice network.

The invention is particularly applicable to a PSK modulated signal having one or more levels and modulated in coherent or differential manner, to a derived signal such as offset QPSK, or to any modulation method enabling a constant amplitude signal to be obtained (coherent phase modulation), to a PSK modulated signal having shifts in amplitude with the amplitude being processed by known methods, and to an FSK modulated signal with hypotheses being tested by taking account of a plurality of modulation frequencies.

BRIEF DESCRIPTION OF THE DRAWINGS

An implementation of the invention is described by way of example with reference to the accompanying drawings, in which:

FIG. 1, are a flow chart showing the method of the present invention;

FIG. 5 shows a device for implementing the method of the present invention.

DETAILED DESCRIPTION OF THE PREFERRED EMBODIMENTS

Figure 1A:
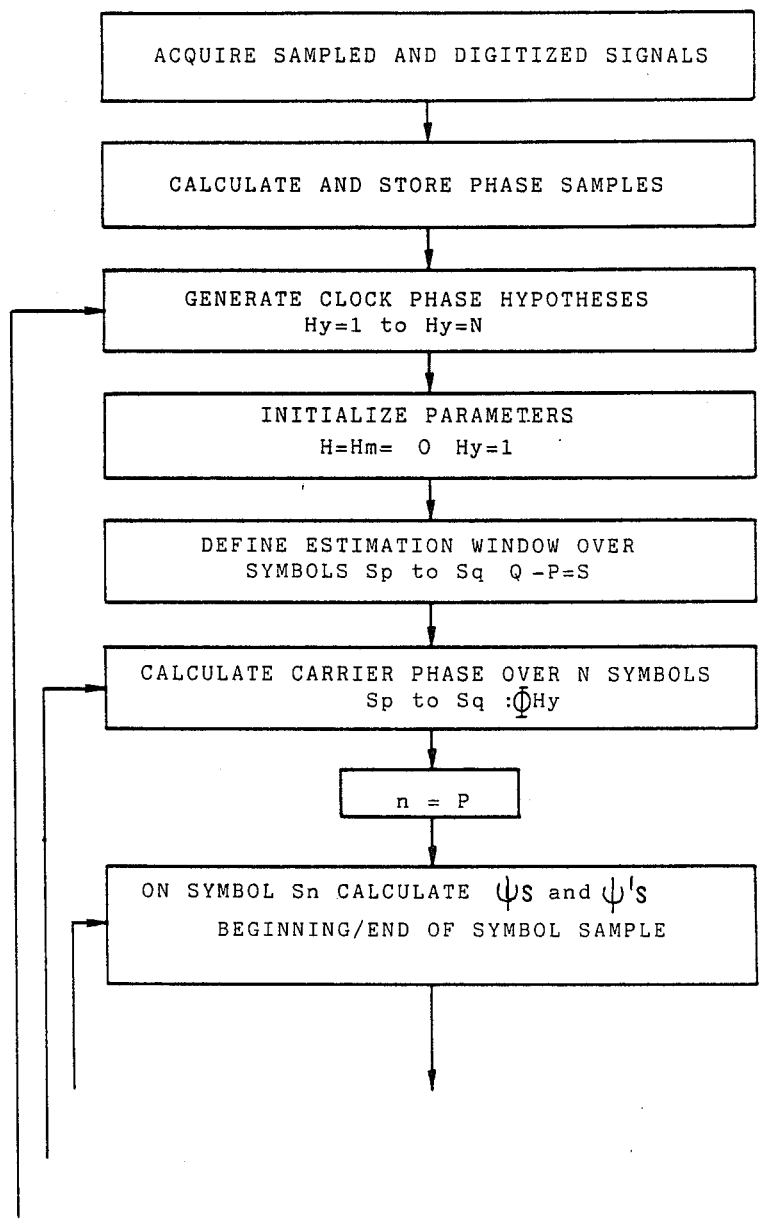
FIGS. 1A and 1B, which together comprise

The present invention relates to demodulating signals received from a geostationary satellite under critical Eb/No conditions (energy per bit/noise per Hertz) in conjunction with a clock rate and a carrier which are not accurately known.

The proposed method approaches the performance of a tuned filter by using linear estimators working on the phase of the received signal.

The method may be applied to the types of modulation used in the following circumstances:

With telecommunications satellites, regardless of whether the demodulation members are on the ground or on the satellite, e.g. using BPSK modulation (Binary Phase Shift Keying) or QPSK modulation (Quaternary Phase Shift Keying) either with time divided multiple access (TDMA) or with frequency divided multiple access (FDMA), and using one or more carrier channels.

In ground networks using cables or optical fibers (base band signals) or microwave beams, or even modulated signals in the telephone band.

In distribution networks, either at subscriber premises for value-added users (a data base front end, a computer, or a bulletin board system), or use at telecoms premises.

Or in any system using modulated signals (remote control, telemetry, telephone signalling, measuring distances, . . . ).

Other spin-offs may also be developed, in particular for eliminating known signals from a signal to be demodulated (echo cancelling), and for unscrambling modulated data signals.

The method of the invention is based on an overall demodulation method based on testing hypotheses concerning the phase of the symbol rate in the modulated signal.

In order to properly understand the succession of operations performed, reference is made to a received signal for which the symbol rate has a known value which is subject to uncertainty limited to 1%, with the phase of said rate being unknown. Further, the received signal is modulated by phase shift keying (PSK) such that during one period of the symbol rate, the signal is constituted by a sinusoidal carrier of known frequency and at a phase which remains constant.

The problem to be solved thus amounts to discovering the symbol rate phase (i.e. determining the beginning and ending instants of the symbol), in discovering the phase of the carrier by eliminating the modulation whose characteristics are assumed to be known, and then in deducing the phase of the signal during each of these symbol rate periods, which phase is indicative of a particular symbol, thereby enabling the value of said symbol to be reproduced.

The method of the present invention comprises the following stages in succession:

An acquisition stage in which sampled and digitized signals are acquired.

A calculation and storage stage during which phase samples are calculated and stored, demodulation is based on acquiring sampled and digitized signals. The analytic signal associated with the samples stored in this way is constructed as is the developed phase of said signal. This provides a representation of the received signal in the form of phase samples which may be associated with amplitude values.

A stage during which hypotheses concerning the clock phase are generated. Different hypotheses concerning the symbol rate phase are generated on the basis of the stored samples.

A stage during which the carrier phase and the symbol rate phase are calculated over n symbols. The modulation is removed on the basis of each of the preceding hypotheses by performing modulo ±x operations and using the "cylindrical center of gravity", as described below, thereby making it possible to evaluate the carrier phase during each symbol, and thus making it possible to estimate the carrier phase over S symbols, where S is selected as a function of the uncertainties on the symbol rate and on the carrier. Starting from the carrier phase, knowledge of the symbol rate phase is obtained by maximizing a parameter H which is a function of the phase obtained in this way and of values characteristic of inter-symbol phase transitions.

A demodulation stage, where demodulation is performed by comparing the phase of the signal during the symbol under consideration and the phase of the carrier. By comparing the phase of the signal during each symbol under consideration with the phase $\phi$ of the carrier, it is possible to demodulate the signal for each of the symbols (processing the sign of $D_k$).

Figure 1B:
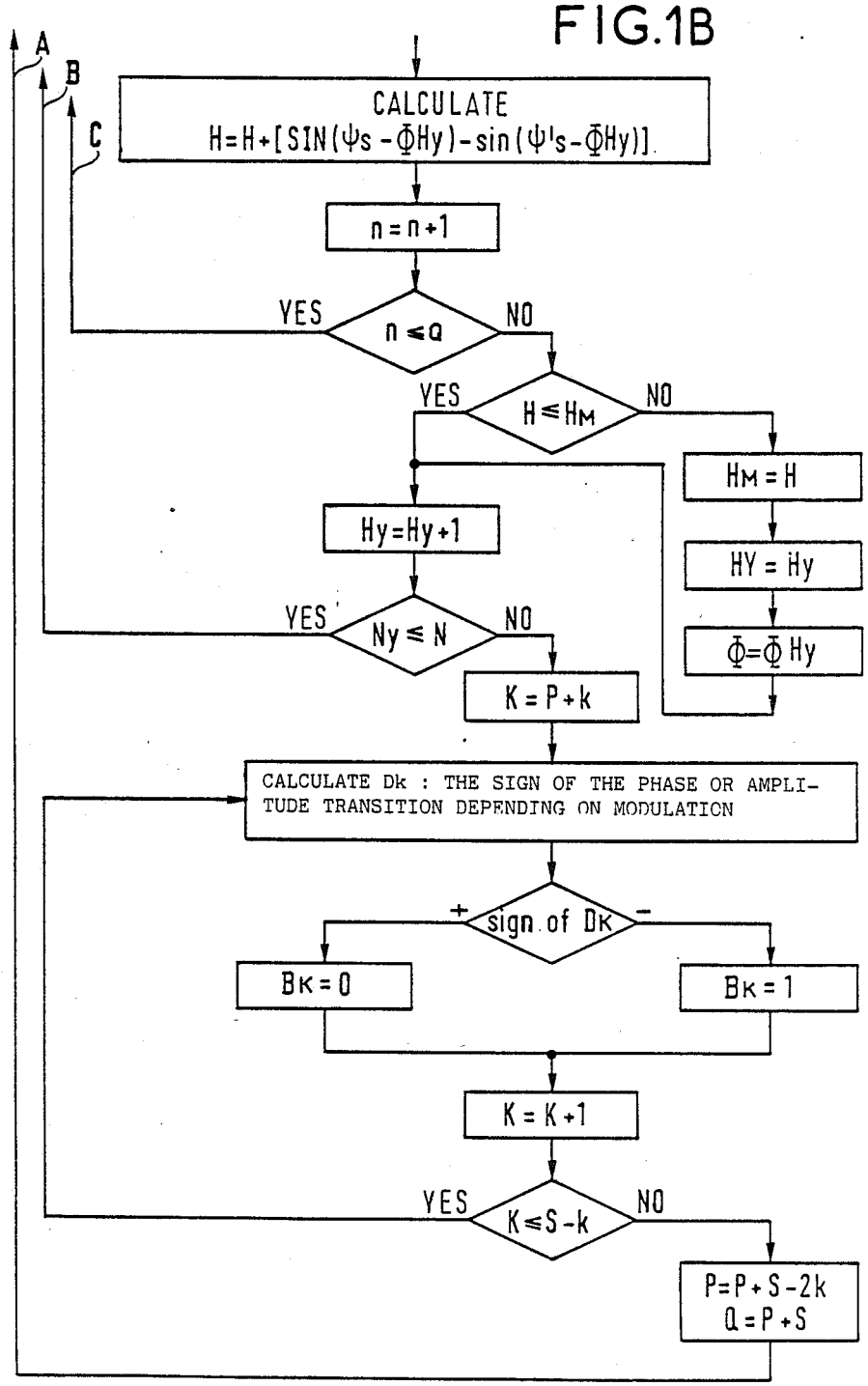

Reference may be made to the flow chart of FIG. 1 for obtaining a better understanding of the logical sequence of events during these various stages, and in particular for the following calculations.

Calculating the hypothetical carrier phase $\Phi_{Hy}$ for the hypothesis Hy under consideration and for each symbol in the range $S_p$ to $S_q$ where n is the order number of the symbol and $p \leq n \leq q$.

Calculating the parameter:

$$H = \sum_{n=p}^{q} [\sin(\psi_s - \Phi_{Hy}) - \sin(\psi'_s - \Phi_{Hy})]$$

where $\psi_s$ and $\psi'_s$ are respectively the phase before and after the transition.

Calculating the maximum $H_M$ of the parameter H, thereby making it possible to deduce the carrier phase $\phi$ relative to $\Phi_{Hy}$ of the selected hypothesis, and also to deduce the corresponding symbol rate phase.

Figure 2:
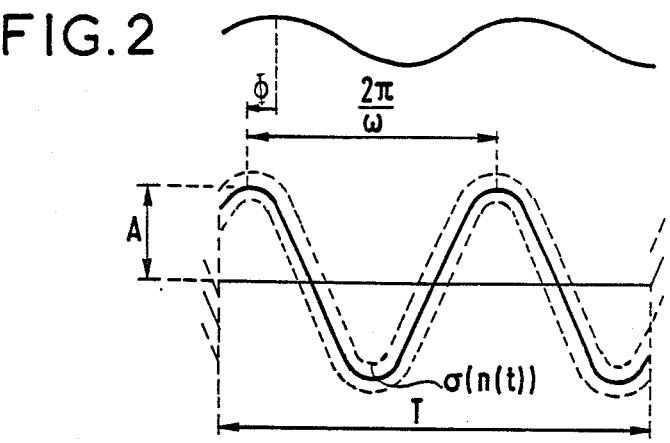
FIGS. 2, 3 and 4 are diagrammatic representations for illustrating the method of the present invention.

The signal to be demodulated has the characteristics shown in FIG. 2, which shows a sinusoidal signal of constant phase during one symbol period at rate T, and the signal may have a different phase during the preceding or the following symbol periods. The signal can be described by the following:

$$x(t) = A \sin(wt + \phi) + n(t),$$

where
- A: peak amplitude;
- w: angular frequency of carrier; and
- $\phi$: phase during symbol $S_n$.

The reference carrier is also shown at the top of the figure.

The first stage of the method of the invention consists in transforming the signal into digitized samples.

The analytic signal and then in the developed phase can then be constructed as described in co-pending patent application Ser. No. 197,251 filed this day under the title "A method of digitally evaluating the frequency and the phase of signals, and a device for implementing such a method", thereby making it possible to obtain samples representative of the phase of the signal in digital form, and on which all of the algorithms are based.

Figure 3:
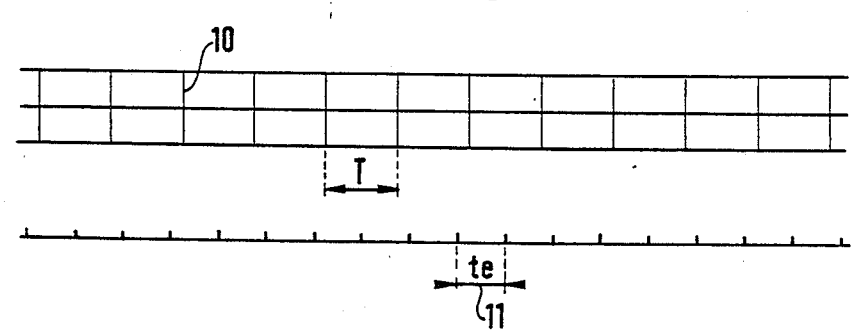

FIG. 3 shows the signal for a succession of symbols together with the locations of the phase samples representing it, including the phase transitions 10 at the beginnings and the ends of the symbols, and the time positions 11 of the signal phase samples.

The sampling frequency is selected in such a manner as to ensure that two successive samples are "just" mutually decorrelated.

Given that the sampling frequency and the symbol rate are not coherent, the choice of sampling frequency must take account of:
the symbol rate and the corresponding uncertainty; and the uncertainty in the carrier frequency.

Given these factors, it must thus make it possible to provide a sufficient number of samples per symbol to enable the phase of the carrier to be calculated for each symbol with the accuracy required for demodulation performance.

With the symbol rate being known, the phase transitions 10 need to be located at proper time positions during the stage in which the clock phase hypotheses are generated. Given a period of duration equal to the symbol period and located at random relative to the phase samples (T and te slipping relative to each other), this time interval is partitioned into n equal portions, and the probability of finding signal phase transitions in each of the partitions of T is considered in succession.

Given these hypotheses, the selected symbol rate phase is determined as a function of a criterion which is defined and calculated using the rules described below.

The following operations are performed on phase samples modulo $\pm x$.

The representation of phase angles modulo $\pm x$ is deduced from the representation of numbers modulo N as used for digitizing (binary, decimal, hexadecimal, ...).

For any angle $\Phi$ lying between $-\infty$ and $+\infty$, its representation modulo $\pm x$ is given by an angle $\phi$ lying between $-x$ and $+x$ such that if 101 lies between $(2n-1)x$ and $(2n+1)x$, then:

$$x/(\Phi-\phi)=\tfrac{1}{2}n$$

for integer n, and:

$$-x<\phi<+x$$

Similarly, an operation $y=(\alpha+\beta)$ is designated from the operation $y'=\alpha+\beta$ and the modulo transformation described above, which is the same as saying:

if $-x\leq y'<+x$, then $y=y'$ if $y'\geq +x$, then $y'\leftarrow(y'-2x)$ and the test is repeated until $-x\leq y'<+x$ if $y'<-x$, then perform $y'\leftarrow(y'+2x)$ and the test is repeated until $-x\leq y'<+x$.

In the special case of $x=\pi/N$ (for integer N), all of the sectors of dimension 2x lying between $(2k-1)x$ and $(2k+1)x$ (for integer k) are caused to overlap the sector $\pm x$.

If $x=\pi$, the equivalence class is of dimension $2\pi$.

The notion of the "cylindrical center of gravity" is deduced from the conventional center of gravity notion and is adapted to the cylindrical configuration in which angles are represented over time. This notion of the cylindrical center of gravity modulo $\pm x$ is based on the fact that the center of gravity of angles situated in a range of amplitudes less than x can be calculated by uniform weighting. Thus, in order to calculate the center of gravity of l phases $\Phi_1, \Phi_2, \ldots, \Phi_l$ defined over the interval $-x\leq \Phi_i<+x$, the centers of gravity of the positive phases $\Phi^+$ and of the negative phases $\Phi^-$ are calculated separately, knowing that, given the modulo rule, if $\phi=(2k+1)x$, in particular if $k=0$, then $\phi=-x$.

Consequently, if the phases are changing, one goes directly from $\Phi=+x$ to $\Phi=-x$.

In addition:

$$\Phi^+ = \begin{cases} (1/l^+)\Sigma_t\Phi_t & \text{if } l^+ > 0 \\ \Phi_t > 0 \\ 0 & \text{if } l^+ = 0 \end{cases}$$

$$\Phi^- = \begin{cases} (1/l^-)\Sigma_t\Phi_t & \text{if } l^- > 0 \\ \Phi_t < 0 \\ 0 & \text{if } l^- = 0 \end{cases}$$

Moving the origin to $\Phi^-$, the following is obtained:

$$\Phi_0=(\Phi^+-\Phi^-)\text{modulo }\pm x$$

and taking the cylindrical center of gravity modulo $\pm x$ of $\Phi^+$ and $\Phi^-$ with respective weightings $l^+$ and $l^-$, and then returning to the initial origin, the center of gravity modulo $\pm x$ is obtained:

$$\Phi=[(l^+/l)\Phi_0+\Phi^-]\text{modulo }\pm x$$

It can be shown that when $(\Phi^+-\Phi^-)<x$, the method of the invention is equivalent to applying the mean to the set of phases over the interval $-x, +x$. In contrast, if $(\Phi^+-\Phi^-)>x$, it is necessary to work over the interval $-2x, 0$ in order to obtain the result.

The construction of the cylindrical center of gravity as described makes it possible to reproduce the mean value of the phase taking account of the uncertainties inherent in evaluating it (evaluating phase over intervals or dimensions $2\pi$ or submultiples thereof), or to fold these intervals over (eliminating modulation), or to take the bisector of several phase angles.

Samples representative of signal amplitude may advantageously be introduced in order to weight each of the corresponding phases, thereby taking account of uncertainty related to noise.

Figure 4:
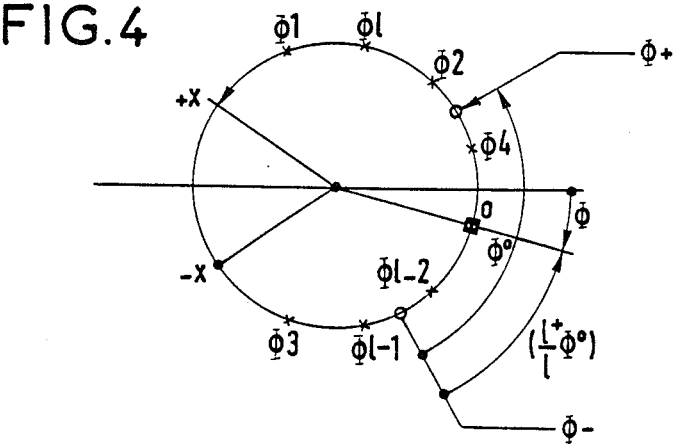

FIG. 4 shows the construction of the cylindrical center of gravity:

Number of $\phi_i > 0$: $l^+(\phi_1, \phi_2, \phi_4, \ldots, \phi_l)$

Number of $\phi_i < 0$: $l^-(\phi_3, \ldots, \phi_{l-2}, \phi_{l-1},)$ $l^+ + l^- = l$ $\phi^+ = (l/l^+)(\phi_1 + \phi_2 + \phi_4 + \ldots + \phi_l)$ $\phi^- = (l/l^-)(\phi_3 + \ldots + \phi_{l-2} + \phi_{l-1})$ $\phi'_0 = \phi^+ - \phi^- \geq 0$ then $\phi_0 = \phi'_0$ mod $\pm x$ i.e.:

if $\phi'_0 < x$ $\phi_0 = \phi'_0$ if $\phi'_0 \geq x$ $\phi_0 = \phi'_0 - 2x$ $\phi'^+ = (l^+/l)\phi_0 + \phi^-$ then $\phi = \phi'$ mod $\pm x$, i.e.:

if $-x \leq \phi' < +x$ $\phi = \phi'$
if $\phi' \geq x$ $\phi = \phi' - 2x$
$\phi' \geq -x$ $\phi = \phi' + 2x$ Assuming that the clock phase (at symbol rate) is defined by the hypothesis under consideration, account is taken for each of the symbols of the phase samples which are included in the corresponding period.

By using the cylindrical center of gravity method over the symbol duration, the phase $\theta_s$ of the signal is determined for the symbol under consideration.

The number of samples taken into account (ratio T/te) depends on the various uncertainties (carrier and symbol rate). If the carrier and the symbol rate are perfectly stable, one phase sample per symbol could be considered to be sufficient.

By eliminating modulation using a modulo rule adapted to the type of modulation and by using the cylindrical center of gravity over the largest number of symbols compatible with the instabilities in the carrier and symbol rate, it is possible to obtain the carrier phase with modulo ambiguity related to the type of modulation, which ambiguity can easily be eliminated by continuity over successive estimates.

All of the above-described operations are performed for each of the phase hypotheses. Given, for each hypothesis over a window comprising S symbols, both the phase of the carrier and values characteristic of phase transitions between one symbol and the next, and using the notation:

$\psi_s$ = phase before the transition; and
$\psi'_s$ = phase after the transition, then the parameter H is calculated over the set of S symbols using:

$$H \stackrel{\Delta}{=} \Sigma_s |\sin(\psi_s - \Phi) - \sin(\psi'_s - \Phi)|$$

and the phase hypothesis which gives the maximum value for this parameter is selected.

The corresponding carrier phase and symbol rate phase are deduced therefrom to within 1/n.

All of the information required for demodulation is now available:

$\theta_s$ = the relative phase of the symbol under consideration; and $\Phi$ = the phase of the carrier.

For each of the symbols, the necessary information is carried by the value of the angle:

$(\theta_s - \Phi)$

Decisions are taken on criteria depending on said value and the type of modulation under consideration.

Two particular examples of applications (L biphase and differential BPSK) will serve for further explaining the demodulation method.

The method of the invention may be applied to L biphase modulation associated with phase shifts of $(\pm \phi)$.

In this type of modulation, each binary symbol corresponds to a carrier phase as specified in Table I at the end of the description.

It can thus be said that the value (0 or 1) of a bit is represented by the direction of the phase shift which occurs in the middle of the symbol.

In order to obtain protection against uncertainties in clock frequency, the signal is over-sampled by using 2n samples per symbol (n samples per ½ symbol).

It is also assumed that the sampling rate is not a multiple of the symbol rate.

In order to estimate the carrier frequency from the phase samples obtained by calculation on the analytical signal:

$\Phi = $ Arc tan q/r as described in the explanation of the construction of the developed phase in the above-mentioned copending patent application Ser. No. 197,251 filed this day, 2n phase samples are obtained per symbol in the signal which is to be demodulated.

The frequency of the carrier is known:

either from a preamble of sufficient length to obtain the desired estimate (transmission in "bursts", SARSAT messages-AMRT system); or else from a priori knowledge of the carrier to a given approximation.

It is thus possible to abstract the known approximation to the phase rotation modulo $\pm \pi$ from the phase samples of the signal.

For each of the clock phase hypotheses, a succession of S symbols is considered (over a duration ST), with the number S being selected so that $S\Delta T$ (where $\Delta T$ equals the uncertainty on the symbol rate) is negligible compared with T and the variants of the estimated phase of the frequency is negligible compared with the period of the carrier.

$<(\Phi - \Phi)^2> = 1/(2sp)$ where $\rho = A^2/2\sigma^2$

All the following reasoning and calculation is applicable to each of the symbol rate phase hypotheses.

Each symbol comprises 2n phase samples referred to as:

$\Phi_1, \Phi_2, \Phi_3, \ldots, \Phi_{2n}$

In order to take account of the position of the phase transition in the middle of the symbol:

the cylindrical center of gravity is calculated for the symbols $\Phi_1, \Phi_2, \ldots, \Phi_n$ modulo $\pm \pi$;

the cylindrical center of gravity is calculated for the symbols $\Phi_{n+1}, \Phi_{n+2}, \ldots, \Phi_{2n}$ modulo $\pm \pi$; and the cylindrical center of gravity modulo $\pm \pi/2$ of the two preceding centers of gravity is taken.

In order to reduce the standard deviation of the estimator of the carrier phase, the cylindrical center of gravity of the results obtained over S symbols is taken, thus obtaining a phase difference relative to the carrier estimated to within $\pm \pi/2$ and having variance given by:

$$<(\Phi - \Phi)^2> = 1/(2S\rho)$$

Ambiguity is removed by using the fact that the phase of the carrier changes by less than $\pi/2$ between two successive estimates.

Given the phase $\Phi_t$ modulo $\pm \pi$ of the preceding estimate, and the phase $\Phi'_t$ which has just been calculated modulo $\pi/2$, the following are calculated:

$$\Phi'_t - \Phi_t \text{ and:}$$

if $-\pi/2 \leq (\Phi'_t - \Phi_t) < +\pi/2$, then $\Phi'_t$ is not changed if $\quad (\Phi'_t - \Phi_t) < -\pi/2$, then $\Phi'_t$ is replaced by $(\Phi'_t + \pi)$ modulo $\pm \pi$ if $\quad (\Phi'_t - \Phi_t) \geq \pi/2$, then $\Phi'_t$ is replaced by $(\Phi'_t + \pi)$ modulo $\pm \pi$ This gives the reference phase of the carrier, with the difference $(\Phi'_t - \Phi_t)$ being usable for correcting the known estimate of the frequency.

In order to estimate the symbol rate phase, an attempt is made to determine which phase samples occur in the vicinity of the beginnings and endings of each symbol. 4n phase hypotheses are available for this purpose: 2n hypotheses in phase with the samples and 2n between the samples.

For each of these hypotheses, the phase of the carrier $\phi$ is calculated over a sequence of S symbols and in the middle of said sequence, and for each of the symbols in the sequence the cylindrical center of gravity $\psi_s$ modulo $\pm \pi$ is calculated for the n first samples and the cylindrical center of gravity $\psi'_s$ modulo $\pm \pi$ is calculated for the last n samples. If the samples in the center are in danger of appearing simultaneously with the phase transition, then $\psi_s$ is calculated over $\Phi_1$ to $\Phi_{n-r}$ and $\psi'_s$ is calculated over $\Phi_{n+r+1}$ to $\Phi_{2n}$, where r is representative of the duration of the phase transition.

The criterion for selecting the best hypothesis is the amplitude of the phase shift compared to the phase. The selected hypothesis is thus the hypothesis which gives the largest value to the quantity H given by:

$$H \stackrel{\Delta}{=} \Sigma_s |\sin(\psi_s - \Phi) - \sin(\psi'_s - \Phi)|$$

The operation described above relates to acquiring the symbol rate. The symbol rate acquired in this way can be used for demodulating k bits situated in the middle of the S bit estimation range.

For the following estimates, the number of hypotheses may be restricted to only those hypotheses which lie on either side of the result of the preceding estimate.

Finally, during message synchronization periods for which the binary sequence is known, a more effective test may be obtained if positioning is performed to within less than one symbol.

To perform demodulation, it is assumed that the carrier phase and the symbol rate phase estimated over S symbols can be used for demodulating k ($<S$) symbols centered on the middle of the range.

The bit value of the k symbols under consideration is then given by the sign of the expression:

$$\sin(\psi_s - \Phi) - \sin(\psi'_s - \Phi)$$

This expression may also be directly used if N messages containing the same information are superposed in order to improve the error rate (low C/N ratio) by performing weighted decoding or symbol-to-symbol superposition.

The method of the invention may also be applied to phase shift modulation.

The simplest application is described below, namely BPSK modulation to $\pm \pi/2$ using the modulation scheme of Table II situated at the end of the description, and it is then generalized to M-level phase modulation schemes over the range $(2k-1)\pi/M$ (for integer $k \leq (M-1)$).

In the following description, it is assumed that the sampling rate is not a multiple of the symbol rate. A phase sample during the stable portion of the clock phase "just" decorrelated for the noise of the preceding sample therefore suffices for defining phase during the symbol.

Methods for generating this sample for the various symbol rate hypotheses under consideration are based on methods for digitizing, for constructing the analytic signal, for digital filtering, and for constructing the developed phase which are described in the above-mentioned copending patent application Ser. No. 197,251 filed this day. The selection of the phase sample assumes, naturally, that the circuits in question are adapted to obtaining the desired result (adapted in the signal filtering sense, in particular).

All of the following calculations are performed for each of the symbol phase hypotheses under consideration so that by testing the hypotheses it is possible to define the symbol phase, and then to track it and demodulate the signal.

In order to estimate the carrier phase, from one phase sample $\psi_s$ per symbol, the phase rotation corresponding to knowledge about the carrier frequency is subtracted. This gives rise to a sequence of phase samples $\Phi_t$ modulo $\pm \pi$ which are transformed into samples $\phi_t$ by performing an operation modulo $\pm \pi/2$ in order to remove the modulation, as shown below:

if $-\pi/2 \leq \Phi_t < +\pi/2$ then $\phi_t = \Phi_t$ if $\quad \Phi_t < -\pi/2$ then $\phi_t = \Phi_t + \pi$ if $\quad \Phi_t \geq \pi/2$ then $\phi_t = \Phi_t - \pi$ The cylindrical center of gravity is then calculated modulo $\pm/2$ over the largest number of symbols S compatible with carrier frequency stability and the knowledge of the symbol phase as obtained using the above-described method. To do this, the cylindrical centers of gravity of the positive phases $\phi+$ and the negative phase $\phi-$ are calculated, writing:

$$\Phi^+ = \begin{cases} (1/I^+)\Sigma_t \Phi_t & \text{if } I^+ > 0 \\ \Phi_t > 0 \\ 0 & \text{if } I^+ = 0 \end{cases}$$

$$\Phi^- = \begin{cases} (1/I^-)\Sigma_t \Phi_t & \text{if } I^- > 0 \\ \Phi_t < 0 \\ 0 & \text{if } I^- = 0 \end{cases}$$

then $\phi_0 = (\phi^+ - \phi^-) \mod \pi/2$ and finally $\psi = [(I^+ / I)\phi_0 + \phi^-] \mod \pi/2$ This give rise to a phase value to which $\pi/2 \mod \pm\pi/2$ is added in order to obtain the estimated phase $\psi'_t$ of the carrier calculated over the S symbols under consideration and defined over the interval $\pm\pi/2$.

Because of the phase difference between two successive estimates is always less than $\pi/2$, ambiguity is removed by taking advantage of continuity in phase change between the preceding estimate $\alpha_t$ (interval $\pm\pi$) and $\phi'_t$ (interval $\pm\pi/2$) in order to find $\alpha'_t$ by applying:

$$\alpha'_t = \psi'_t \quad \text{if } -\pi/2 \leq (\psi'_t - \alpha_t) < \pi/2$$
$$\alpha'_t = (\psi'_t + \pi) \mod \pm\pi \quad \text{if } (\psi'_t - \alpha_t) < -\pi/2$$
$$\alpha'_t = (\psi'_t - \pi) \mod \pm\pi \quad \text{if } (\psi'_t - \alpha_t) \geq \pi/2$$

This provides the carrier phase $\alpha$ for each of the symbol rate hypotheses under consideration, with the mean square deviation of the estimate being:

$$1/(2S\rho)$$

where S is the number of symbols under consideration, and $\rho$ is the signal to noise ratio S/B including phase noise and carrier instability.

In order to estimate the symbol rate phase, and to test the symbol phase hypotheses, a search is made for pairs of samples in base band bracketing the beginnings (or ends) of the symbols. Let these values by $\beta_s$ and $\beta'_s$ for the i-th symbol. The hypothesis to be selected is the hypothesis which gives the largest value for H when calculated using the formula:

$$H \stackrel{\Delta}{=} \Sigma_s |\sin(\beta_s - \alpha) - \sin(\beta'_s - \alpha)|$$

After this test has been performed, the following are retained:

(a) the clock phase related to the maximum in H; and
(b) the corresponding carrier phase.

The clock phase is subsequently tracked over the three hypotheses surrounding the preceding phase.

Demodulation is performed directly on the value of the phase resulting from the operation:

$$\psi_s - \Phi$$

in accordance with Table III situated at the end of the description, where:

$\psi_s$ = the phase of the signal calculated for each of the symbols modulo $\pm\pi$; and $\Phi$ = the carrier phase resulting from the above-described estimate; with $\psi_s$ and $\Phi$ being those that result from the selected symbol rate phase hypothesis.

The method of the invention can be applied by generalizing to M-level (M>2) PSK modulation and to FSK modulation.

All of the above-described operations are applicable to M-level PSK modulation, provided:

the carrier phase calculation is performed after initialization using a modulo $\pm\pi/M$ operation (instead of $\pm\pi/2$), and then the cylindrical center of gravity is calculated modulo $\pm\pi/M$ (instead of $\pm\pi/2$); and demodulation is performed using a phase table suitable for the type of modulation in question.

For FSK modulation, several frequencies need to be taken into consideration. The application of the method is thus equivalent to performing tests on hypotheses in which various different frequencies are attributed to each of the symbols under consideration.

As shown in FIG. 5, apparatus for implementing the method of the present invention comprises a digital processor 20 receiving the signal to be analyzed at its input SA after it has passed through a digitizer 21 driven by a stable reference clock 22.

The processor 20 comprises:

a common memory 23;
a circuit 24 for generating phase samples;
a circuit 25 for generating symbol rate phase hypotheses;
a circuit 26 for calculating the carrier phase (e.g. over five symbols);
a circuit 27 for selecting the symbol rate phase hypothesis;
a circuit 28 for calculating the phase of the signal (e.g. over one symbol);
a demodulation circuit 29;
a circuit 30 for controlling the demodulator interface;
an interface circuit 31 for demodulated signals; with all of the above circuits being connected to an interconnection bus 32 by respective two-way links, and with the last two circuits being connected to each other by a two-way link; and
a circuit 33 for acquiring input digitized samples and connected to the common memory 23 via a one-way link.

The demodulated signal interface circuit 31 has two outputs:

a demodulated signal output SS1; and
a signal quality output SS2,
which outputs constitute the outputs from the processor 20.

Such a device is usable regardless of the type of demodulation which is selected.

This architecture provides all of the circuits required for performing the method of the invention, some of which may be specific to a particular type of modulation.

When the carrier frequency is known with a degree of uncertainty which requires the value of the carrier frequency to be acquired and tracked in order to obtain required demodulation performance, then the frequency is evaluated on the basis of the method described in our above-mentioned copending patent application Ser. No. 197,251 filed this day.

The architecture described assumes:

that the carrier frequency is known a priori to a degree of accuracy which is compatible with the number S of symbols taken into account for estimating the carrier phase; and that the symbol rate is known a priori with a degree of uncertainty which is less than 1/10 of the difference between two hypotheses over a duration of S symbols.

This architecture makes the following operations possible:

The signal to be demodulated is acquired and stored in memory in the form of raw digital symbols coming from a digitizer which delivers the amplitude of the signal to be demodulated at a sampling rate.

The amplitude samples are converted into phase samples including sample filter processing and converting the signal into two components (real and quadrature) in order to obtain the sampled phase.

Symbol rate phase hypotheses are generated which are suitable for splitting up the signal into time slices of duration T (1/T=rate) suitable for the various demodulation stages (acquisition and tracking). When tracking, the number of hypotheses taken into account should be reduced to the minimum necessary.

The carrier phase over one symbol is calculated for each symbol rate phase hypothesis, and then the carrier phase is estimated over S symbols after the modulation has been eliminated.

The symbol phase is compared with the carrier phase, thereby making is possible to extract the demodulated signal (with symbol meaning being carried by the signal phase) and also making it possible to estimate the quality of the modulated signal during each symbol and the quality of the demodulation.

The physical architecture used for constructing a demodulator for applying the method of the present invention relies on the following principles.

Tasks are shared between different calculating members which operate independently from one another.

All of the results of tasks performed by any of the calculating members can be read independently by any of the others. Addressable memories are used which are accessible over a common or "multiport" bus or else which are organized in a lattice network interconnecting the various calculating members.

Each calculating member has a delimited zone in the memory (memories) specifically attributed thereto for exclusive writing purposes.

Naturally, the present invention has been described merely by way of preferred example, and its component elements could be replaced by equivalent elements without thereby going outside the scope of the invention.

The description relies mainly on two types of modulation (L biphase associated with $\pm\phi$ modulation, and differential BPSK modulation). However, the method of the present invention is applicable to any other type of modulation having a finite number of states.

The various calculation tasks required for demodulation may be implemented using calculating members under software control, with each member being independent from the other members and being capable of addressing the memories to read any of the results of the other members as well as the signal samples as originally written in the memory and also the results of its own calculations, or to write its own calculation results in a zone of the memory which is specifically attributed thereto, said memories being common and being constituted by lattice networks.

TABLE I

| | 1st ½ Symbol | 2nd ½ Symbol |
|---|---|---|
| 0 | $-\phi$ | $+\phi$ |
| 1 | $+\phi$ | $-\phi$ |

TABLE II

| | Phase relative to carrier |
|---|---|
| 0 | $+\pi/2$ |
| 1 | $-\pi/2$ |

TABLE III

| Value of $(\psi_s - \Phi)$ modulo $+\pi$ | Value of bit |
|---|---|
| >0 | 0 |
| <0 | 1 |

We claim:

1. A digital method of demodulating digitally modulated signals, said method comprising the steps of:
   acquiring digitized samples of said signals;
   calculating phase samples from said digitized samples and storing said phase samples;
   generating a plurality of symbol rate phase hypotheses on the basis of said stored phase samples;
   calculating a carrier phase from said phase samples for each of said plurality of hypotheses, selecting one of said calculated carrier phases and its corresponding symbol rate phase hypothesis to obtain a selected carrier phase and symbol rate phase over a predetermined number of symbols; and
   demodulating said digitally modulated signals by comparing the selected carrier phase to the phase of said digitally modulated signal during a symbol under consideration.

2. A method according to claim 1, wherein said step of calculating said phase samples comprises constructing an analytic signal from said stored digitized samples and developing a phase of said stored digitized samples, to thereby obtain a representation of the received digitally modulated signal in the form of phase samples which can be associated with amplitude values.

3. A method according to claim 1, wherein said steps of calculating and selecting a carrier phase and symbol rate phase comprise the steps of:
   starting from symbol rate phase hypotheses using modulo $\pm x$ operations and using a cylindrical center of gravity, estimating a carrier phase over S symbols by eliminating modulation from said digitally modulated signal to evaluate the carrier phase during each symbol, wherein S is selected as a function of the uncertainty on the symbol rate and on the carrier, calculating a parameter H for each hypothesis which is a function of the estimated carrier phase and values characteristic of intersymbol phase transitions, and selecting a symbol rate phase and carrier phase for which said value H is a maximum.

4. A method according to claim 1, wherein the digitized samples are stored in memory from which they are extracted as often as necessary for the purposes of the calculations performed using a single algorithm which is applied to a plurality of symbol rate hypotheses, from which calculations the symbol rate phase and the carrier phase can be deduced using a criterion adapted to the type of modulation, thereby making it possible to extract the demodulated information simply and also to assess the quality of the modulated signal and the quality of the demodulation operation.

5. A device for demodulating digitally modulated signals, said device comprising:
   a stable reference clock;
   a digitizer receiving said digitally modulated signals as an input and for digitizing said signals in accordance with said stable reference clock; and
   a digital processor receiving the digitized signal output from said digitizer and for sampling said digitized signals, calculating phase samples from the digitized samples and storing said phase samples, generating a plurality of symbol rate phase hypotheses from the stored phase samples, calculating from said phase samples and for each of said plurality of hypotheses a carrier phase and symbol rate phase over a predetermined number of symbols, selecting a carrier phase and symbol rate phase from amongst the calculated carrier and symbol rate phases, and demodulating said digitally modulated signals by comparing the selected phase of said carrier to the phase of said digitally modulated signal during a symbol under consideration.

6. A device according to claim 5, wherein said digital processor comprises:
   sampling means for sampling said digitized signals to obtain digitized samples;
   a memory coupled to said sampling means via a unidirectional link for storing at least said digitized samples;
   first means for generating phase samples from the stored digitized samples;
   second means for generating a plurality of symbol rate phase hypotheses;
   third means for calculating the signal phase over a symbol under consideration;
   fourth means for calculating a carrier phase over plural symbols;
   fifth means for selecting a symbol rate phase hypothesis as a symbol rate phase;
   a demodulator circuit responsive to said stored samples, said calculated carrier phase and said calculated signal phase for demodulating said digitally modulated signals;
   an interface for providing said demodulated signals as an output from said processor;
   control means for controlling said interface;
   an interconnection bus; and
   respective bidirectional links connecting each of said memory, first through fifth means, demodulator, interface and control means to said interconnection bus and a further bidirectional link connecting said interface and control means.

7. A device according to claim 5, wherein said digital processor comprises memory means and a plurality of software-controlled calculating members each independent of the others and each capable of addressing said memory means for (1) reading the originally recorded signal samples, the results of its own calculations and any of the results of the other calculating members, and (2) writing the results of its own calculations in a zone of said memory means which is specifically attributed thereto.

8. A method according to claim 1, wherein said digitally modulated signals are modulated according to a modulation technique which enables a constant amplitude signal to be obtained.

9. A method according to claim 1, wherein said digitally modulated signals comprise Phase Shift Keying signals having shifts in amplitude.

10. A method according to claim 1, wherein said digitally modulated signals comprise Frequency Shift Keying signals, and wherein said step of calculating a carrier phase and symbol rate phase comprises testing each hypothesis in consideration of a plurality of modulation frequencies.

11. A method according to claim 1, wherein said digitally modulated signals comprise coherent or differential Phase Shift Keying signals having one or more levels.

12. A method according to claim 1, wherein said digitally modulated signals comprise Quaternary Phase Shift Keying signals.

13. A device according to claim 6, wherein said interface has a first output for demodulated signals and a second output for representing signal quality.

* * * * *